US008622301B2

(12) United States Patent
Hasegawa

(10) Patent No.: US 8,622,301 B2
(45) Date of Patent: Jan. 7, 2014

(54) CELLULAR PHONE, CONTROL METHOD, CONTROL PROGRAM, AND FACE PANEL USED FOR THE CELLULAR PHONE

(75) Inventor: Motoyoshi Hasegawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1297 days.

(21) Appl. No.: 11/990,341

(22) PCT Filed: Aug. 15, 2006

(86) PCT No.: PCT/JP2006/316285
§ 371 (c)(1),
(2), (4) Date: Feb. 12, 2008

(87) PCT Pub. No.: WO2007/021021
PCT Pub. Date: Feb. 22, 2007

(65) Prior Publication Data
US 2009/0104933 A1    Apr. 23, 2009

(30) Foreign Application Priority Data
Aug. 17, 2005    (JP) .................................. 2005-237012

(51) Int. Cl.
*G06K 7/10*    (2006.01)
(52) U.S. Cl.
USPC .................................................... 235/462.01
(58) Field of Classification Search
USPC .................................................... 235/462.01
See application file for complete search history.

(56) References Cited

U.S. PATENT DOCUMENTS

| 2002/0077069 | A1  | 6/2002  | Heurtaux |
| 2004/0014490 | A1* | 1/2004  | Muramatsu et al. ........ 455/550.1 |
| 2005/0038872 | A1* | 2/2005  | Ono et al. ...................... 709/218 |
| 2006/0123041 | A1* | 6/2006  | Sandrini et al. ............... 707/102 |
| 2006/0232662 | A1  | 10/2006 | Otaka et al. |

FOREIGN PATENT DOCUMENTS

| EP | 1 156 646 A1 | 11/2001 | |
| JP | 2003-289350 | 10/2003 | |
| JP | 2004-56696 | 2/2004 | |
| JP | 2004-221860 | 8/2004 | |
| JP | 2004-320121 | 11/2004 | |
| JP | 2004320121 | * 11/2004 | .............. H04M 1/00 |
| WO | WO2004/102931 | 11/2004 | |

OTHER PUBLICATIONS

European Search Report dated Jan. 10, 2011.

* cited by examiner

*Primary Examiner* — Michael G Lee
*Assistant Examiner* — David Tardif
(74) *Attorney, Agent, or Firm* — McGinn Intellectual Property Law Group, PLLC

(57) ABSTRACT

A two-dimensional code B of a face panel or the like photographed by the camera 6 is analyzed. An analysis result of the two-dimensional code B is compared with each of key words stored in a memory 5. When there is a key word that corresponds with the analysis result, a mask of the content corresponding to the coincident key word is removed to execute a process corresponding to the content. This makes it possible to show a user the content so that the content is added, and it is possible to show the content like a purchase privilege such as a face panel. For this reason, it can be expected that amusement thereof is improved, and a number of face panels become widely used.

8 Claims, 6 Drawing Sheets

| CONTENTS ID No. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| ID.1 (GIFT 1) | あ | | ま | | け | | 1 | | | | | | | | | |
| ID.2 (GIFT 2) | あ | | ま | | け | | 2 | | !  | | | | | | | |
| ID.3 (GIFT 3) | あ | | ま | | x | y | z | | | | | | | | | |
| ID.4 (GIFT 4) | あ | | 1 | 2 | a | | | | | | | | | | | |
| ID.5 (GIFT 5) | あ | | !  | | | | | | | | | | | | | |
| ⋮ | | | | | | | | | | | | | | | | |

FIG. 6

| ID.1 | [82 A8 82 DC 82 AF 82 50 20 20 20 20 20 20 20 20 20 20 20] |
| ID.2 | [82 A8 82 DC 82 AF 82 51 81 49 20 20 20 20 20 20 20 20 20] |
| ID.3 | [82 A8 82 DC 78 79 7A 20 20 20 20 20 20 20 20 20 20 20 20] |
| ID.4 | [82 A8 31 32 61 20 20 20 20 20 20 20 20 20 20 20 20 20 20] |
| ID.5 | [82 A8 21 20 20 20 20 20 20 20 20 20 20 20 20 20 20 20 20] |

FIG. 7

CELLULAR PHONE, CONTROL METHOD, CONTROL PROGRAM, AND FACE PANEL USED FOR THE CELLULAR PHONE

TECHNICAL FIELD

The present invention relates to a cellular phone, a control method, a face panel, and a control program used for the cellular phone. In particular, the present invention relates to a cellular phone that masks and stores a content or function control program in advance to execute a specific process, whereby the content or function control program can be used, a control method, a face panel, and a control program used for the cellular phone.

BACKGROUND ART

Recently, each of most cellular phones is equipped with a camera function. Further, in such a cellular phone, a two-dimensional code in which predetermined information is included may be photographed by this camera function, and a process corresponding to an analysis result of the two-dimensional code may be executed. According to a non-patent document ("from a bar code to a two-dimensional code", [online], Denso Wave Inc., Internet: URL: http://www.denso-wave.com/grcode/aboutgr.html), by utilizing a two-dimensional code, more information can be stored in a small space. For this reason, in a cellular phone capable of dealing with reading of a two-dimensional code, in the case where a network address such as a telephone number, an electronic mail address, and an internet address, for example, is displayed with a two-dimensional code, various services can be received by reading and storing the two-dimensional code and accessing the read address. Further, a document created with a personal computer or the like is converted into a two-dimensional code, and the two-dimensional code can also be read by the cellular phone to transmit it as an electronic mail.

DISCLOSURE OF THE INVENTION

Problems to be Solved by the Invention

Since a cellular phone has a function corresponding to reading of a two-dimensional code, practicability is improved so that an operation to input a network address is omitted and an electronic mail created with a personal computer or the like is inputted. The cellular phone having a function corresponding to the reading of the two-dimensional code is expected to utilize the function in view of amusement in addition to the practicability.

On the other hand, in response to diversification of the taste of a user, multiple kinds of face panels that can be applied to and removed from an enclosure of a cellular phone are provided. The appearance can be changed arbitrarily by exchanging face panels. However, even though the multiple kinds of face panels that can be attached and removed are provided, buyers are normally limited. Thus, a possibility that a number of face panels become widely used is not high.

In view of the circumstances described above, it is an object of the present invention to provide a cellular phone, by which it is possible to improve amusement for a user and it can be expected that a number of face panels become widely used.

It is another object of the present invention to provide a control method, a control program and a face panel that are used in the above cellular phone.

Means of Solving the Problems

According to the present invention, there provides a cellular phone that includes photographing means and executes an operation corresponding to an analysis result of a code by photographing the code by means of photographing means, predetermined information being included in the code, the cellular phone including: storage means that masks and stores one or more content or function control program, the storage means registering key words for respectively specifying the one or more content or function control program; and control processing means that analyzes the code photographed by the photographing means, and compares an analysis result of the code with each of the key words registered by the storage means wherein in the case where there is a key word that corresponds with the analysis result, the control processing means removes a mask of the content or function control program corresponding to the key word and executes a process corresponding to the content or function control program.

As the code, a two-dimensional code or a one-dimensional code is utilized.

It is preferable that the code is set to one or more face panel that can be attached to and removed from an enclosure of the cellular phone, and that each of the one or more content or function control program masked and stored by the storage means is provided so as to be associated with one of face panels.

Further, according to the present invention, there provides a control method utilized for a cellular phone, the cellular phone including photographing means and executing a process corresponding to an analysis result of a code by photographing the code by means of photographing means, predetermined information being included in the code, the control method including: masking one or more content or function control program to store it, and registering key words for respectively specifying the one or more content or function control program; and analyzing the code photographed by the photographing means, and comparing an analysis result of the code with each of the key words registered by the storage means wherein in the case where there is a key word that corresponds with the analysis result, a mask of the content or function control program corresponding to the key word is removed and a process corresponding to the content or function control program is executed.

Moreover, according to the present invention, there provides a program utilized for a cellular phone, the cellular phone executing a process corresponding to an analysis result of a code by photographing the code by means of photographing means, predetermined information being included in the code, the program causing the cellular phone to execute: analyzing the code photographed by the photographing means, and comparing an analysis result of the code with key words for respectively specifying a content or function control program registered by storage means wherein in the case where there is a key word that corresponds with the analysis result, a mask of the content or function control program masked and stored in the storage means and corresponding to the key word is removed and a process corresponding to the content or function control program is executed.

Furthermore, according to the present invention, there provides a face panel capable of being attached to and removed from an enclosure of a cellular phone, the cellular phone comprising: storage means that masks and stores one or more content or function control program and registers key words for respectively specifying the one or more content or function control program; and control processing means that analyzes the code photographed by the photographing means, and compares an analysis result of the code with each of the key words registered by the storage means wherein in the case where there is a key word that corresponds with the analysis result, the control processing means removes a mask of the content or function control program corresponding to the key word and executes a process corresponding to the content or function control program, wherein the code having information for specifying the content or function control program is attached to a predetermined position of the face panel.

According to one aspect of the present invention, for example, a two-dimensional code photographed by the photographing means is analyzed, and the analysis result of the two-dimensional code is compared with each of the key words stored in the storage means. When there is a key word that corresponds with the analysis result, a mask of a content or function control program corresponding to the coincident key word is removed to execute a process corresponding to the content or function control program. Thus, it is possible to show a user so that the content or function control program is added. This makes it possible to improve amusement.

Further, according to another aspect of the present invention, one or more face panel that can be attached to and removed from the enclosure of the cellular phone is provided, and for example, a two-dimensional code is provided for each of the face panels. The respective contents or function control programs masked and stored in the storage means are provided so as to be associated with the face panels. Thus, since the user is caused to show so that the content or function control program is added, it is possible to view the user so that the content or function control program is a purchase bonus of the face panel. For this reason, it can be expected that a number of face panels become widely used, and sales thereof are promoted

BRIEF DESCRIPTION OF THE DRAWING

FIG. 6 is a view showing an example of respective key words stored in a memory 5; and FIG. 7 is a view showing an example of data corresponding to the respective key words in FIG. 6.

BEST MODE FOR CARRYING OUT THE INVENTION

There provides a cellular phone that removes a mask of a stored content or function control program and executes a process corresponding to the content or function control program by providing multiple kinds of face panels that can be attached to and removed from an enclosure of the cellular phone and reading a two-dimensional code attached to each of the face panels.

Figure 1:
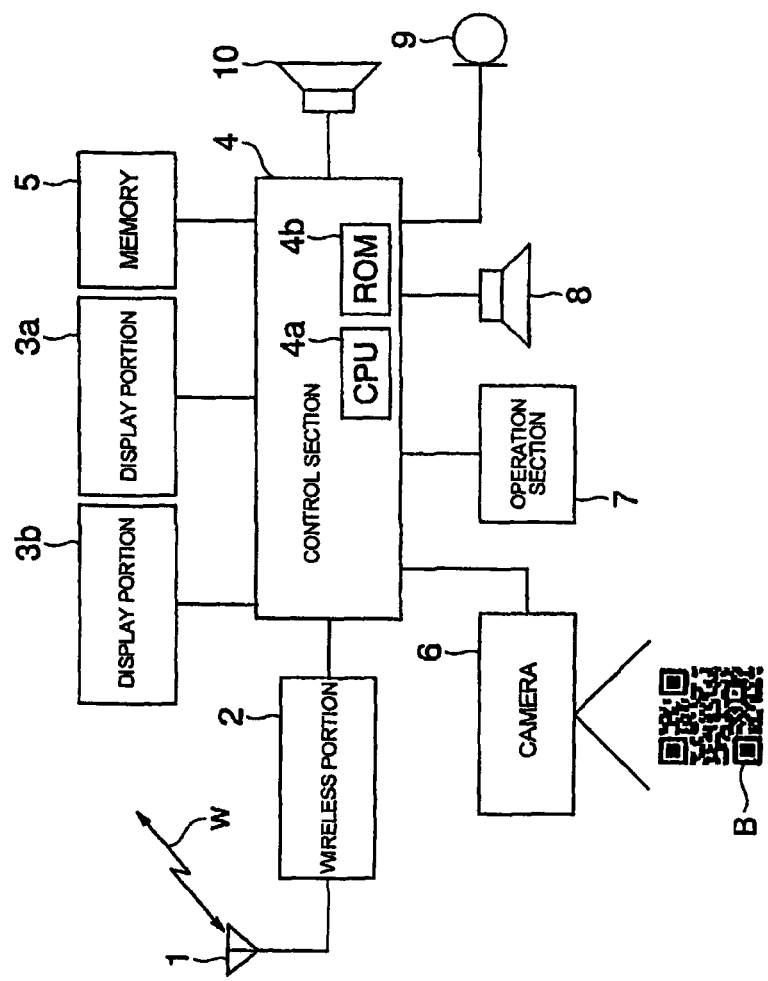
FIG. 1 is a block diagram showing the electrical configuration of a main part of a cellular phone according to an exemplary embodiment of the present invention.

FIG. 1 is a block diagram showing the electrical configuration of a main part of a cellular phone according to an exemplary embodiment of the present invention.

As shown in FIG. 1, the cellular phone of the present exemplary embodiment is constructed from an antenna 1, a wireless portion 2, display portions 3*a*, 3*b*, a control section 4, a memory 5, a camera 6, an operation section 7, a speaker 8, a microphone 9, and a receiver 10. The antenna 1 transmits and receives a radio signal "w" to and from a wireless base station (not shown) within a cell of territory of the wireless base station. The wireless base station is connected to a general telephone line network via a visitor mobile-services switching center and a gateway mobile-services switching center (not shown). The wireless portion 2 executes modulation and demodulation of the radio signal "w" to be transmitted and received to and from the wireless base station via the antenna 1. Each of the display portions 3*a*, 3*b* is configured from a liquid crystal display, for example. The display portion 3*a* displays, for example, a telephone number, a clock, inside/outside of a service area, a telephone book display, a schedule display, a calendar display, a function menu display, a current mode and the like. The display portion 3*b* displays, for example, a clock, inside/outside of a service area, a current mode and the like.

The camera 6 is configured from a camera by a CMOS sensor, a CCD sensor or the like, for example. The camera 6 not only executes photographing a still image and recording a video, but also photographs a two-dimensional code (a two-dimensional code B of the face panel) in which predetermined information is included in the present exemplary embodiment, in particular. As this two-dimensional code B, a "QR code" (registered trademark) developed by DENSO WAVE Inc. is utilized, for example. The operation section 7 is constructed from a transmission key, a numeric keypad, a conversion key of English/kana/kanji/numeral, an on/off key for a power source, a cross key for carrying out a cursor operation, an end key and the like, for example. The operation section 7 is means for carrying out various operations such as input of characters and the like, and selection of an item in response to operations of a user. The speaker 8 generates a ring alert. The microphone 9 has a function as a telephone transmitting portion of the cellular phone. The receiver 10 has a function as a telephone receiving portion of the cellular phone.

The memory 5 is configured from a RAM (Random Access Memory), for example. Telephone book data, photographed image data, downloaded data and the like are stored in the memory 5. In the present exemplary embodiment, one or more content or function control program (hereinafter, referred to simply as the "content") is stored in the memory 5 with a mask and a key word for every content is registered, in particular. The control section 4 includes a CPU (central processing unit) 4*a* for controlling the overall cellular phone, and a ROM (read only memory) 4*b* in which control programs for causing the CPU 4*a* to operate are stored. In particular, in the present exemplary embodiment, the control section 4 analyzes the two-dimensional code B photographed by the camera 6, and compares an analysis result of the two-dimensional code B with each of the key words registered in the memory 5. When there is a key word that corresponds with the analysis result, the control section 4 removes the mask of the content corresponding to the coincident key word to execute a process corresponding to the content.

Figure 2:
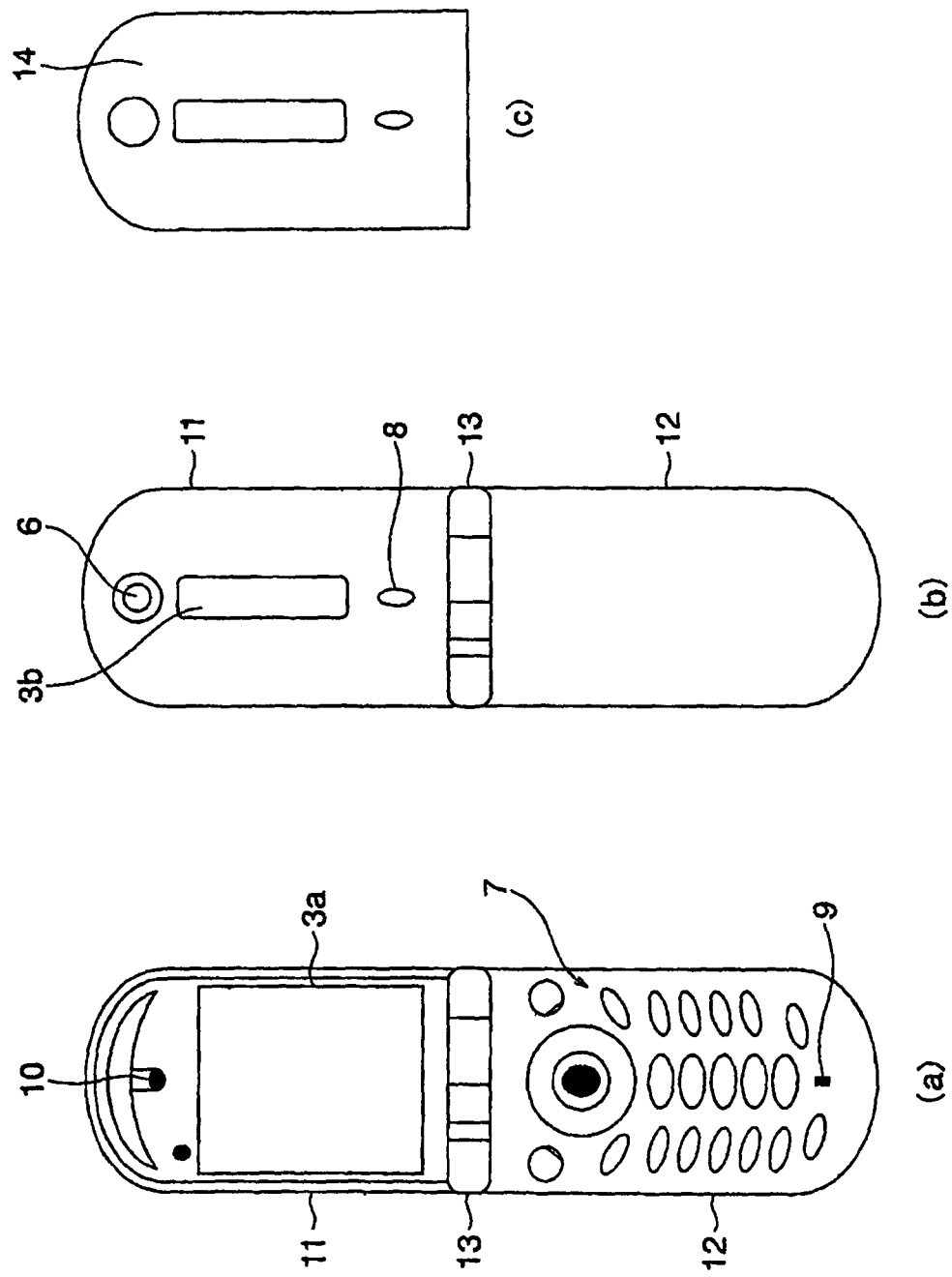
FIG. 2 is a view showing the appearance of the cellular phone of FIG. 1.

FIG. 2 is a view showing the appearance of the cellular phone of FIG. 1. FIG. 2(*a*) is a view showing a front view of the cellular phone, FIG. 2(*b*) is a view showing a back view of the cellular phone, and FIG. 2(*c*) is a view showing a face panel.

This cellular phone includes an upper unit 11 and a lower unit 12 as shown in FIG. 2(*a*). The upper unit 11 is provided with the display portion 3a and the receiver 10 on a front surface thereof, while the lower unit 12 is provided with the operation section 7 and the microphone 9 on a front surface thereof. The cellular phone is configured so as to be capable of folding via a hinge portion 13 in the state where the front surface of the upper unit 11 faces the front surface of the lower unit 12. Further, as shown in FIG. 2(b), the upper unit 11 is provided with the display portion 3b, the camera 6 and the speaker 8 on a back surface thereof. The face panel 14 shown in FIG. 2(c) can be attached to and removed from the back surface of the upper unit 11 via a screw, a clutch or the like (not shown).

A two-dimensional code (not shown) (for example, the two-dimensional code B in FIG. 1) is attached onto the back surface of the face panel 14. Since the multiple kinds of face panels 14 each having a different design are prepared, a different two-dimensional code is attached to each of the face panels 14 in this case. Further, the mask corresponding to the content that has been masked and stored in the memory 5 is removed in accordance with the kind of face panel.

Figure 3:
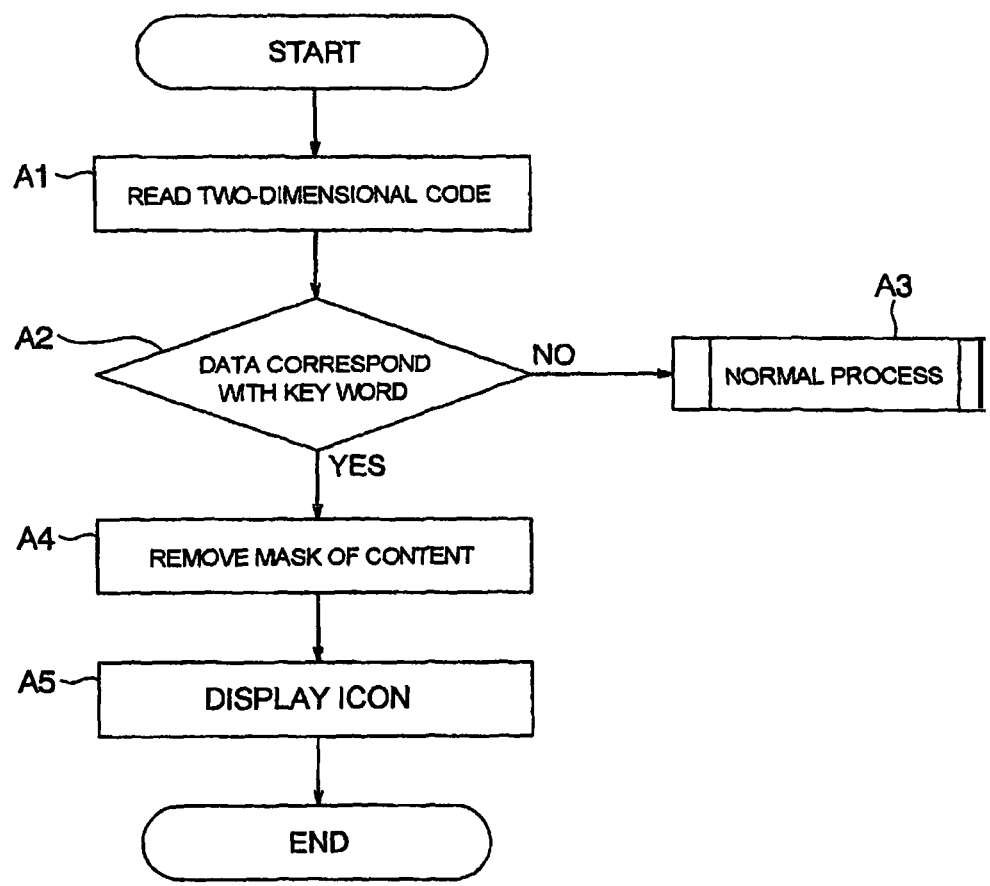
FIG. 3 is a flowchart explaining the operation of the cellular phone of FIG. 1.
Figure 4:
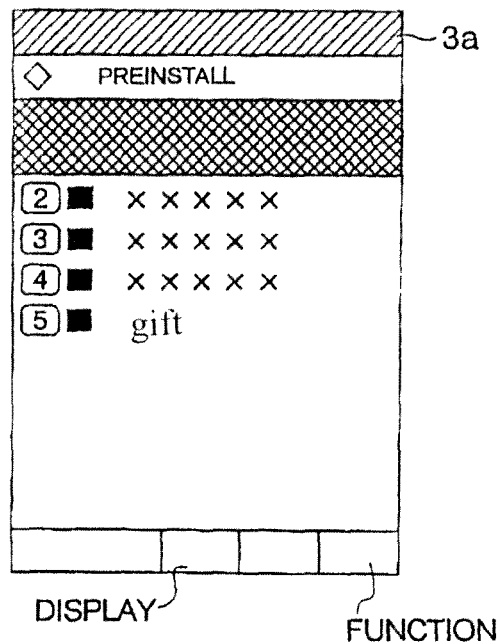
FIG. 4 is a view showing an example of an icon displayed on a display portion 3*a*.
Figure 5:
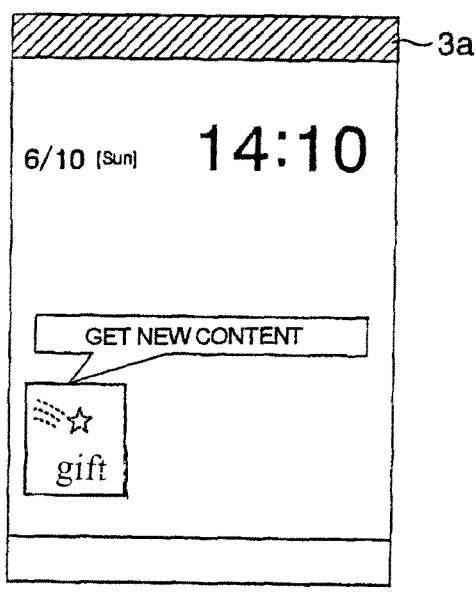
FIG. 5 is a view showing the effect of addition of contents displayed on the display portion 3*a*.

FIG. 3 is a flowchart explaining the operation of the cellular phone of FIG. 1. FIG. 4 is a view showing an example of an icon displayed on a display portion 3a. FIG. 5 is a view showing a display of a display portion 3a for informing addition of contents. FIG. 6 is a view showing an example of respective key words stored in a memory 5. FIG. 7 is a view showing an example of data corresponding to the respective key words in FIG. 6.

Processing contents of control executed in the cellular phone of the present exemplary embodiment will be described with reference to these drawings.

In this cellular phone, the two-dimensional code of the face panel 14 photographed by the camera 6 is analyzed, and the analysis result of the two-dimensional code, that is, one into which the photographed two-dimensional code is converted as text data is compared with each of key word data stored in the memory 5. Then, when the both correspond with each other, the mask of the content corresponding to the coincident key word is removed, and the process corresponding to the content (for example, an image, a melody or the like) is executed.

Namely, the two-dimensional code attached to the face panel 14 is read by the camera 6 before the face panel 14 is attached to the upper unit 11, the read two-dimensional code is decoded by the control section 4, and the decoded one is converted into text data (analysis result) (Step A1). This analysis result is then compared with each of the key words registered in the memory 5 (Step A2). When there is no coincident key word (NO), a normal process corresponding to the analysis result is executed (Step A3). When there is a coincident key word (YES), a non-display flag for the content corresponding to the coincident key word is changed to an off state, whereby the mask is removed (Step A4). As shown in FIG. 4, hiding of a content specified by the two-dimensional code of the face panel on a standby screen of the display portion 3a is removed, and an icon indicating a name of the content is displayed as a preinstalled content (Step A5). To be more specific, an icon of a "gift"("おまけ") in numeral 5 in FIGS. 4 and 5 is an icon in which a hidden content is displayed. Numerals 1 to 4 are preinstalled contents (contents that are not hidden). A content added with a two-dimensional code is to be added to 4 or later.

Then, when an operation to select this icon is carried out, a message that a content is newly added is displayed on the standby screen of the display portion 3a as shown in FIG. 5. Thus, when the operation to select this content is carried out, a process corresponding to the content is executed. For example, in the case where the content is image data, the image data are set as a standby screen or a screen for displaying at incoming and outgoing calls. In the case where the content is melody data, the melody data are set as a tone at a incoming call (a ring tone).

The respective key words registered in the memory 5 are registered in a storage area of 16 bytes as shown in FIG. 6. For example, a key word "おまけ1" of a content ID.1 is registered in the storage area of 16 bytes. Similarly, a key word "おまけ2" of a content ID.2, a key word "おまxyz" of a content ID.3, a key word "お12a" of a content ID.4, a key word "お" of a content ID.5 and the like are registered in the storage areas of 16 bytes. In this case, each character constituting the respective key words is converted into a quadruple-digit or double-digit hexadecimal number to be stored as shown in FIG. 7. Further, a portion of a space in FIG. 6 is converted into a double-digit hexadecimal number ("20") to be stored. For this reason, the respective key words are managed as 16 bytes of data including the space. In the case where the respective key words are registered in the storage areas of 16 bytes in this manner, a text in which a two-dimensional code is decoded is converted into 16 bytes of binary data, and the binary data are compared with 16 bytes of data of a key word.

Thus, even though the decoded text data are converted into a two-dimensional code as they are after reading of the two-dimensional code and the two-dimensional code is secondarily delivered to other cellular phone via a communication line, the mask of the content is never removed in the other cellular phone. Namely, the text data decoded after reading the two-dimensional code in the cellular phone do not include a space or spaces. Thus, even though the text data are again converted into the two-dimensional code as they are to secondarily deliver them to other cellular phone, no space is included in the analysis result of the delivered two-dimensional code. For this reason, the analysis result of the delivered two-dimensional code does not correspond with the key word managed in other cellular phone as 16 bytes of data including the space or spaces. Thus, the mask of the content is never removed in the other cellular phone.

As described above, in the present exemplary embodiment, the two-dimensional code of the face panel 14 photographed by the camera 6 is analyzed, and the analysis result of the two-dimensional code is compared with each of the key words stored in the memory 5. In the case where there is a key word that corresponds with the analysis result, a mask of the content corresponding to the coincident key word is removed to execute a process corresponding to the content. Thus, it is possible to show a user so that a content is added, and it is also possible to show the user so that the content is a purchase bonus of the face panel 14. For this reason, it can be expected that amusement thereof is improved, a number of face panels 14 become widely used, and sales thereof are promoted.

As explained above, although the exemplary embodiment of the present invention has been described in detail with reference to the appending drawings, a concrete configuration is not limited to that in the exemplary embodiment. Change or variation of a design without departing from the scope of the present invention is included in the present invention.

For example, although the content is masked and stored in the memory 5, for example, a function control program such as a calculator function or a TV (television) remote controller function may be masked and stored, and a key word may be registered for every function control program. Thus, when the mask of the function control program is removed, a process corresponding to the function control program is executed.

Further, it is possible to show the user so that a function is newly added. Moreover, in this case, the function control program may be provided so as to be associated with the face panel 14. Furthermore, in the case where the amount of information is few, the two-dimensional code may be a one-dimensional barcode.

Further, the present invention can be applied to a cellular phone in which no face panel is utilized. In this case, a two-dimensional code is attached to a cover of a battery, for example. Moreover, although the enclosure of the cellular phone is a foldable form in the above exemplary embodiment, it may be a straight form or a slidable form. Furthermore, in the above exemplary embodiment, although a matrix type of two-dimensional code developed by Denso Wave Inc. has been utilized as the two-dimensional code B in FIG. 1, in addition to this two-dimensional code, for example, a stacked matrix type of two-dimensional barcode developed by Symbol Technologies, Inc. (USA), a matrix type of two-dimensional code developed by RVSI Acuity ClMatrix (USA), a matrix type of two-dimensional code developed by UPS Inc. (USA) or the like may be utilized.

Industrial Applicability

The present invention can be generally applied to cellular phones that photograph a two-dimensional code by means of a camera and execute an operation corresponding to an analysis result of the two-dimensional code.

The invention claimed is:

1. A cellular phone that executes an operation corresponding to an analysis result of a code by photographing the code by means of photographing means, predetermined information being included in the code, the cellular phone comprising:

storage means that stores one or more contents or function control programs with a respective non-display flag on, the storage means registering key words for respectively specifying the one or more contents or function control programs; and control processing means that analyzes the code photographed by the photographing means, and compares an analysis result of the code with each of the key words registered by the storage means wherein in a case where there is a key word that corresponds with the analysis result, the control processing means displaying an icon or a name of a corresponding one of the contents or function control programs that corresponds with the key word by putting the non-display flag off and in a response to a selection of the icon or the name, making the corresponding one of the contents or the function control programs operable to use, wherein the code is provided for a face panel or face panels that can be attached to and is removed from an enclosure of the cellular phone, and wherein each of the one or more contents or function control programs stored in the storage means is associated with one of the face panels.

2. The cellular phone according to claim 1, wherein the code includes a two-dimensional code or a one-dimensional code.

3. A control method utilized for a cellular phone, the cellular phone executing a process corresponding to an analysis result of a code by photographing the code by means of photographing means, predetermined information being included in the code, the control method comprising:

storing in storage means one or more contents or function control programs with a respective non-display flag on, and registering key words for respectively specifying the one or more contents or function control programs;

analyzing the code photographed by the photographing means, and comparing an analysis result of the code with each of the key words registered in the storage means; and in a case where there is a key word that corresponds with the analysis result, displaying an icon or a name of a corresponding one of the contents or function control programs that corresponds with the key word by putting the non-display flag off and in a response to a selection of the icon or the name, making the corresponding one of the contents or function control programs operable to use, wherein the code is provided for a face panel or face panels that can be attached to and is removed from an enclosure of the cellular phone, and wherein each of the one or more contents or function control programs stored in the storage means is associated with one of the face panels.

4. A non-transitory computer readable storage device for storing a program utilized for a cellular phone, the cellular phone executing a process corresponding to an analysis result of a code by photographing the code by means of photographing means, predetermined information being included in the code, the program causing the cellular phone to execute:

storing in storage means one or more contents or function control programs with a respective non-display flag on, and registering key words for respectively specifying the one or more contents or function control programs;

analyzing the code photographed by the photographing means, and comparing an analysis result of the code with each of key words registered in the storage means ; and in a case where there is a key word that corresponds with the analysis result, displaying an icon or a name of a corresponding one of the contents or function control programs that corresponds with the key word by putting the non-display flag off and in a response to a selection of the icon or the name, making the corresponding one of the contents or function control programs operable to use, wherein the code is provided for a face panel or face panels that can be attached to and is removed from an enclosure of the cellular phone, and wherein each of the one or more contents or function control programs stored in the storage means is associated with one of the face panels.

5. A cellular phone that executes an operation corresponding to an analysis result of a code by photographing the code by means of photographing means, predetermined information being included in the code, the cellular phone comprising:

storage means that stores one or more contents or function control programs with a respective non-display flag on, the storage means registering key words for respectively specifying the one or more contents or function control programs; and control processing means that analyzes the code photographed by the photographing means, and compares an analysis result of the code with each of the key words registered by the storage means wherein in a case where there is a key word that corresponds with the analysis result, the control processing means displaying an icon or a name of the corresponding one of the contents or function control programs that corresponds with the key word by putting the non-display flag off and in a response to a selection of the icon or the name, making the corresponding one of the contents or function control programs operable to use, wherein the code includes a two-dimensional code or a one-dimensional code, wherein the code is provided for a face panel or face panels that can be attached to and is removed from an enclosure of the cellular phone, and wherein each of the one or more contents or function control programs stored in the storage means is associated with one of the face panels.

6. A cellular phone that executes an operation corresponding to an analysis result of a code by photographing the code by means of photographing means, predetermined information being included in the code, the cellular phone comprising:

storage means that stores one or more contents or function control programs with a respective non-display flag on, and information designating the one or more contents or function control programs; and control processing means that analyzes the code photographed by the photographing means, compares an analysis result of the code with the information designating the one or more contents or function control programs, displays a view of the contents or function control programs corresponding to a matched content or a matched function control program when comparison indicates a match, and makes the content or function control program corresponding to the matched content or the matched function control program operable to use in a response to an activation of the view, wherein the code is provided for a face panel or face panels that can be attached to and is removed from an enclosure of the cellular phone, and wherein each of the one or more contents or function control programs stored in the storage means is associated with one of the face panels.

7. The cellular phone according to claim 6, wherein the control processing means displays the view of the contents or function control programs corresponding to the matched content or the matched function control program by putting the non-display flag off.

8. The cellular phone according to claim 6, wherein said activation of the view comprises a selection of the view of the contents or function control programs corresponding to the matched content or the matched function control program.

* * * * *